United States Patent

Miura

Patent Number: 5,499,070
Date of Patent: Mar. 12, 1996

[54] SHUTTER CONTROL DEVICE

[75] Inventor: Kosho Miura, Funabashi, Japan

[73] Assignee: Nikon Corporation, Tokyo, Japan

[21] Appl. No.: 351,141

[22] Filed: Nov. 30, 1994

Related U.S. Application Data

[63] Continuation of Ser. No. 90,572, Jul. 12, 1993, abandoned.

[30] Foreign Application Priority Data

Jul. 29, 1992 [JP] Japan ................................. 4-222043

[51] Int. Cl.⁶ .................................................. G03B 19/12
[52] U.S. Cl. ............................................. 354/152; 354/266
[58] Field of Search ..................................... 354/152, 153, 354/154, 155, 156, 237, 238.1, 239, 240, 266, 267.1, 268, 269

[56] References Cited

U.S. PATENT DOCUMENTS

| | | | |
|---|---|---|---|
| 3,683,776 | 8/1972 | Ono | 354/154 |
| 3,715,964 | 2/1973 | Tenkumo et al. | 354/152 |
| 3,936,848 | 2/1976 | Akiyama | 354/156 |
| 4,152,058 | 5/1979 | Numata et al. | 354/152 |
| 4,185,906 | 1/1980 | Little | 354/152 |
| 4,202,615 | 5/1980 | Nemoto | 354/152 |
| 5,092,673 | 3/1992 | Hayashi | 354/152 |

Primary Examiner—Howard B. Blankenship
Attorney, Agent, or Firm—Shapiro and Shapiro

[57] ABSTRACT

A shutter control device comprises an exposing unit for effecting an exposure, a signal generator for generating a release signal, a mirror for reflecting the light of a subject toward a view optical system, a mirror driver for shifting the mirror between a first position on a photographing light path and a second position off the photographing light path, a position detector for detecting that the mirror is present in the vicinity of the second position and generating a position signal, a timer for measuring a predetermined time on receiving the release signal and generating a time measurement end signal when the predetermined time elapses; and a controller means for actuating the exposing unit when receiving the time measurement end signal and the position signal.

12 Claims, 4 Drawing Sheets

SHUTTER CONTROL DEVICE

This is a continuation of application Ser. No. 08/090,572 filed Jul. 12, 1993, now abandoned.

BACKGROUND OF THE INVENTION

1. Field of the Invention

The present invention relates to a shutter control device suitable for use when tripping a shutter of, e.g., a single-lens reflex camera.

2. Related Background Art

FIG. 1 is a sectional view showing a configuration in section by way of one example of a prior art single-lens reflex camera. Referring to FIG. 1, a subject image passing through a photographing lens 1 is reflected by a mirror 2 toward a viewing optical system 3 and confirmed by a finder 4. When photographed, the mirror 2 retreats to a position (retreat position) indicated by a broken line in the Figure. Thereafter, a shutter 5 constructed of leading and trailing curtains is sequentially tripped, thus effecting an exposure.

A conventional method of electrically setting timings of the retreating action of the mirror 2 and of the tripping action of the shutter 5 is classified mainly into the following two kinds of methods.

According to the first method, a switch changed over interlocking with the retreating action of the mirror 2 is provided. The retreat of the mirror 2 is confirmed from an output of this switch, and the tripping of the shutter 5 is started.

According to the second method, a timer is actuated simultaneously when performing a release operation. After a predetermined time has elapsed (irrespective of the action of the mirror 2), the tripping of the shutter 5 is started.

The prior art discussed above, presents the following problems.

The mirror 2 is driven by a mechanism portion consisting of springs, a motor, etc., and hence a retreat time of the mirror 2 changes with the operational fluctuations of such a mechanism. Therefore, according to the first method, the tripping timing of the shutter 5 depends on the action of the mirror 2. A time (hereinafter called a release time lag) from the release operation to the tripping of the shutter 5 varies infinitesimally per photographing action. This results in such a problem that a shutter chance is hard to capture precisely. Further, during photographing under such conditions that an excessive gravity is applied (e.g., as in an airplane when taking off and landing or an automobile in motion), if the gravity is applied in such a direction as to reduce the retreat time of the mirror 2, the shutter 5 is tripped before the aperture is stopped down. Consequently, there arises a problem of inducing an overexposure exceeding an intended exposure.

The second method has no fluctuation in terms of the release time lag as seen in the first method. Under the conditions, where the gravity is applied in such a direction as to extend the retreating time of the mirror 2, however, it may happen that the shutter 5 is tripped before the retreat of the mirror 2 is completed. In this instance, the mirror 2 is positioned within a photographing picture, and it follows that the photographing picture is vignetted.

To eliminate this problem, the release time lag may be set by giving a sufficient allowance time to the retreating time of the mirror 2. The release time lag should be, however, reduced to the greatest possible degree so as not to lose a shutter chance during normal photographing. Accordingly, the extension of the release time lag is not an adequate solution for the problem described above.

SUMMARY OF THE INVENTION

It is a primary object of the present invention, which has been devised to obviate the problems given above, to prevent vignetting of a photographing picture due to fluctuations in a mirror retreating time and an occurrence of overexposure, and also to minimize fluctuations in a release time lag.

To accomplish the object described above, in accordance with one embodiment of the present invention, there is provided a shutter control device comprising: a focal plane shutter 12 serving as an exposing unit for effecting an exposure; a release switch 16 as a signal generating unit for generating a release signal; a mirror 21 shiftable to a first position on a photographing light path and to a second position off the photographing light path; a mirror-up completion switch 17 as a position detecting unit for detecting that the mirror 21 is present in the vicinity of the second position; a timer circuit 14 as a time measuring unit for measuring a predetermined time on receiving the release signal; and a microcomputer 11 as a control unit for actuating the focal plane shutter 12 when the detection is made by the mirror-up completion switch 17 if a detection time from the generation of the release signal to the detection by the mirror-up completion switch 17 is longer than the predetermined time and actuating the focal plane shutter 12 when the predetermined time is measured by the timer circuit 14 if the detection time is shorter than the predetermined time.

According to the shutter control device in the embodiment described above, the predetermined time measured by the timer circuit 14 is compared with the detection time (mirror-up time) from the generation of the release signal to the shift of the mirror 21 from the first position to the second position. If the detection time is longer than the predetermined time, the focal plane shutter 12 is actuated after a wait for the mirror-up completion. If the detection time is shorter than the predetermined time, the focal plane shutter is actuated after a wait for the completion of measurement of the predetermined time. It is therefore possible to prevent vignetting of the photographing picture due to the fluctuations in the mirror-up time and to prevent the occurrence of the overexposure in a special case where the mirror-up time fluctuates. In the normal photographing, fluctuations in the release time lag can be avoided.

According to the shutter control device in another embodiment, when performing the detection by the mirror-up completion switch 17 and the measurement of the predetermined time by the timer circuit 14, the focal plane shutter 12 is actuated.

According to the shutter control device in this embodiment, when effecting both the measurement of the predetermined time and the detection of the mirror-up completion, the focal plane shutter 12 is actuated. Hence, the photographing picture is not vignetted. Further, the photographing with a uniform release time lag normally can take place.

The shutter control device in still another embodiment includes: a microcomputer 11 serving as a manual mirror-up judging unit for judging whether or not the detection is made by the mirror-up completion switch 17 before generating the release signal; and a timer circuit 14 as a predetermined time setting unit for setting the predetermined time on receiving a result of the detection by the microcomputer 11.

According to the shutter control device in this embodiment, the predetermined time is set depending on whether or not the detection (of the mirror-up completion) is made by the mirror-up completion switch 17 before generating the release signal. Hence, the release time lag during the manual mirror-up action and the release time lag during the normal photographing action can be set to different values.

According to the shutter control device in a further embodiment, when the microcomputer 11 judges that the detection is made after generating the release signal, the predetermined time is set to a first predetermined time. When judging that the detection is made before generating the release signal, the predetermined time is set to a time shorter than the first predetermined time.

According to the shutter control device in this embodiment, the release time lag during the manual mirror-up action can be set shorter than the release time lag during the normal photographing action. It is therefore possible to sufficiently utilize one of merits inherent in the manual mirror-up photographing, whereby the shutter chance is not lost.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
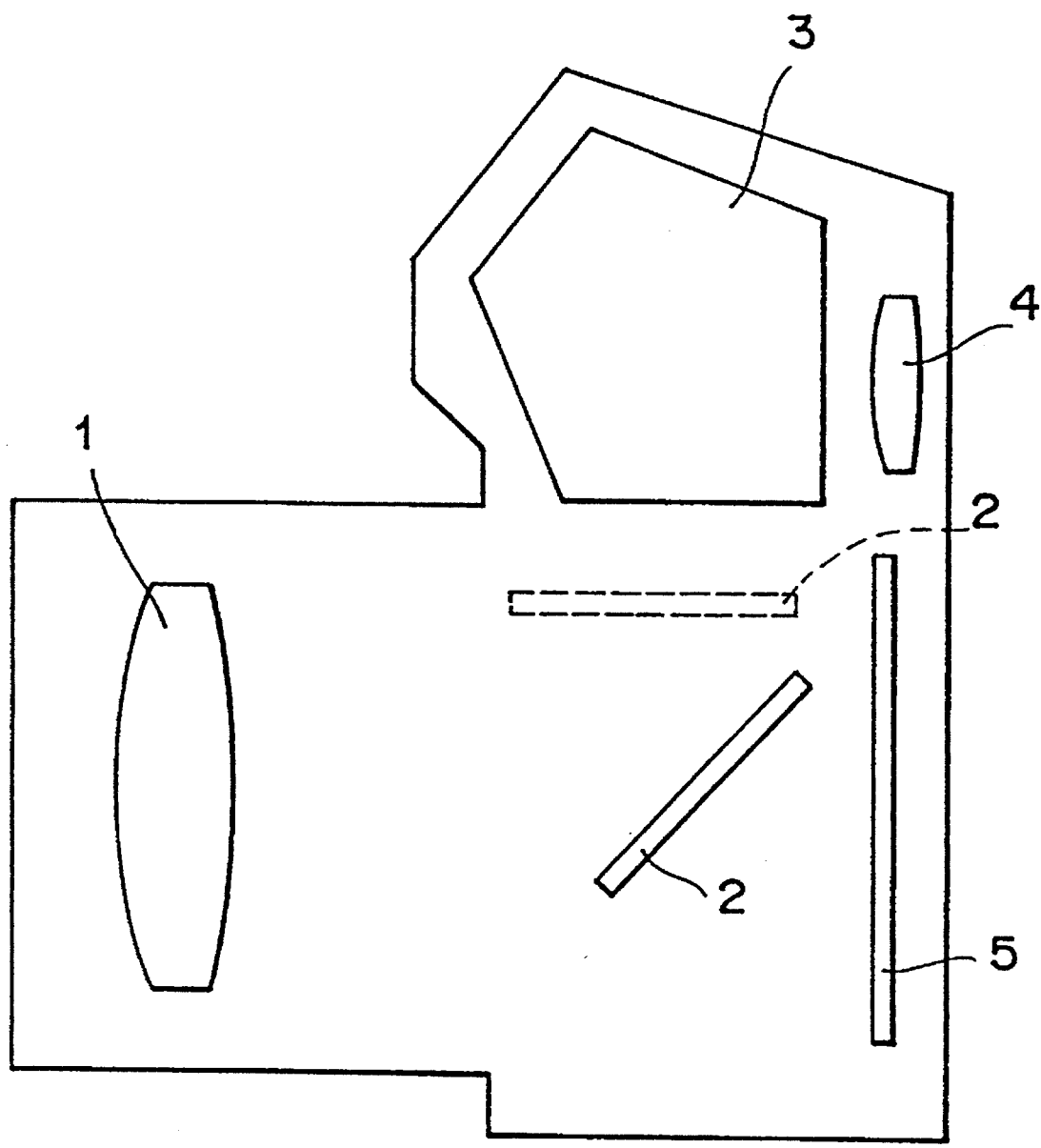
FIG. 1 is a sectional view illustrating a construction in section of a single-lens reflex camera in one example of the prior art.
Figure 2:
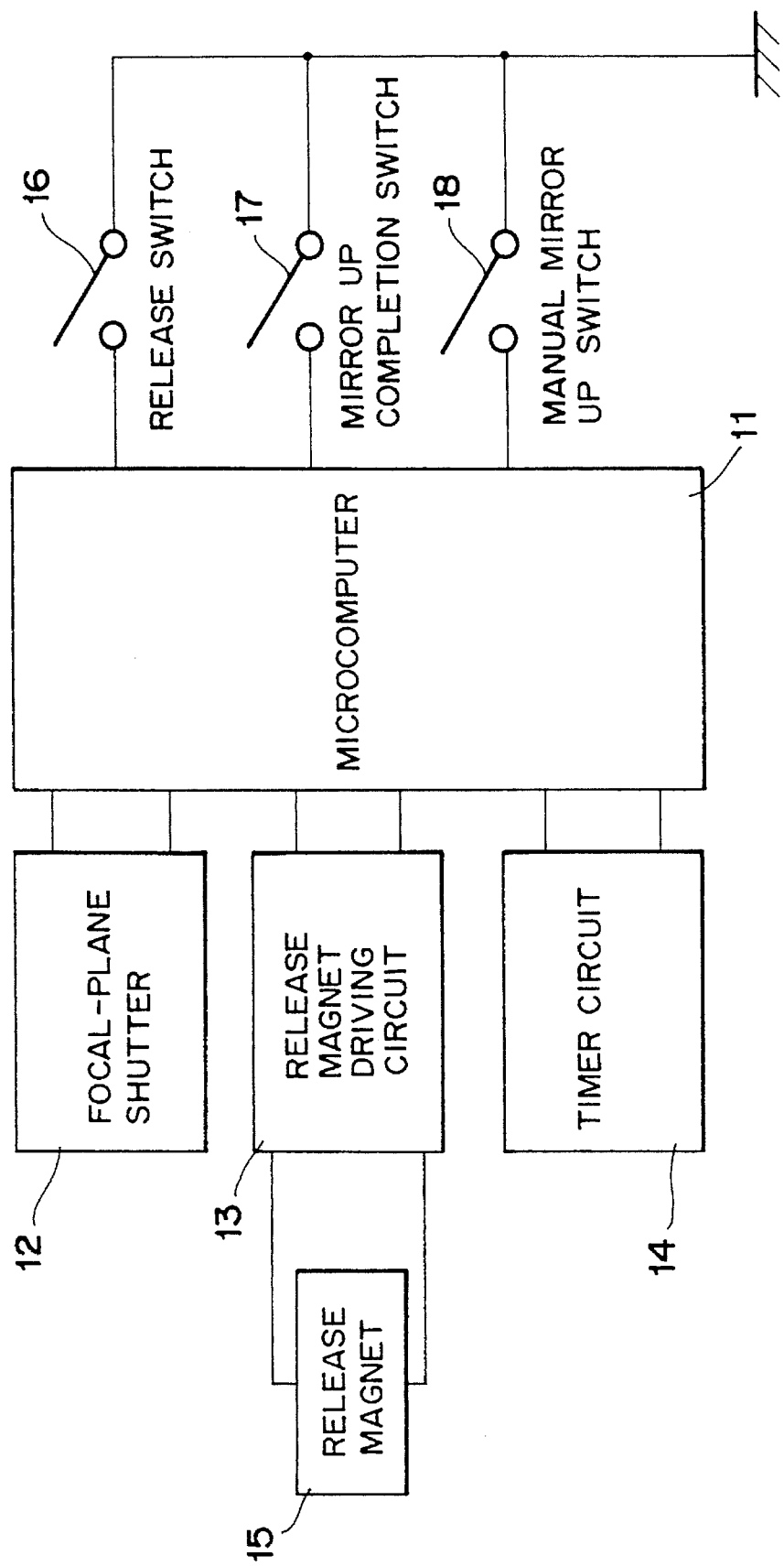
FIG. 2 is a block diagram showing an electrical construction of a single-lens reflex camera to which a shutter control device is applied in one embodiment of the present invention.
Figure 4:
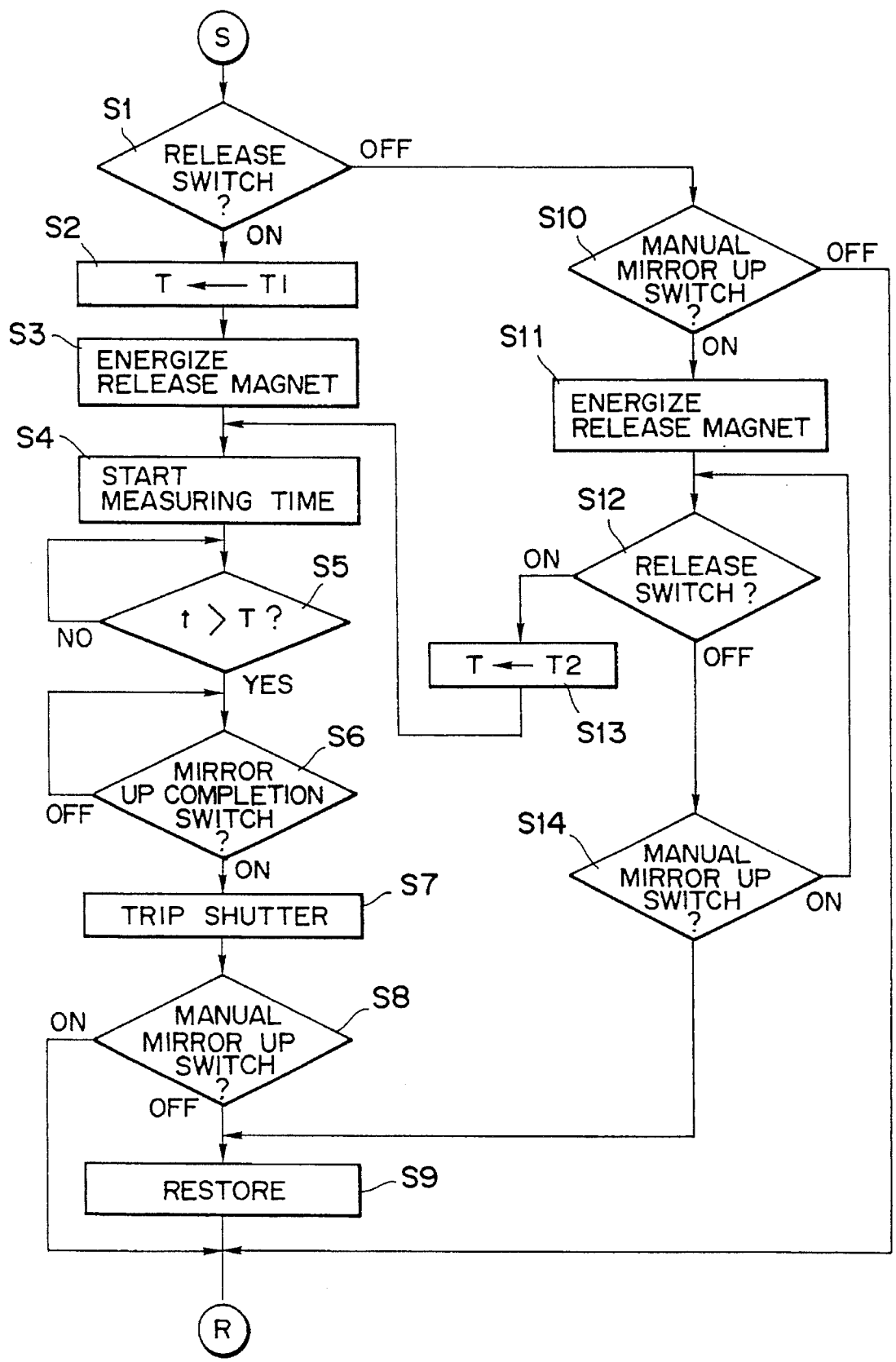
FIG. 4 is a flowchart of assistance in explaining the action of the shutter control device according to this invention.

FIG. 2 is a block diagram illustrating an electrical construction of a single-lens reflex camera to which a shutter control device in one embodiment of this invention is applied. Programs, etc. shown in FIG. 4 are written to a microcomputer 11 (hereinafter called a computer 11). The computer 11 controls each portion of the camera in accordance with the programs.

A focal plane shutter 12 (hereinafter referred to as a shutter 12) is constructed with a leading curtain and a trailing curtain. The shutter 12 is controlled by the computer 11 to provide a predetermined exposure time. A release magnet energizing circuit 13 energizes a release magnet 15 in accordance with a command from the computer 11.

Figure 3:
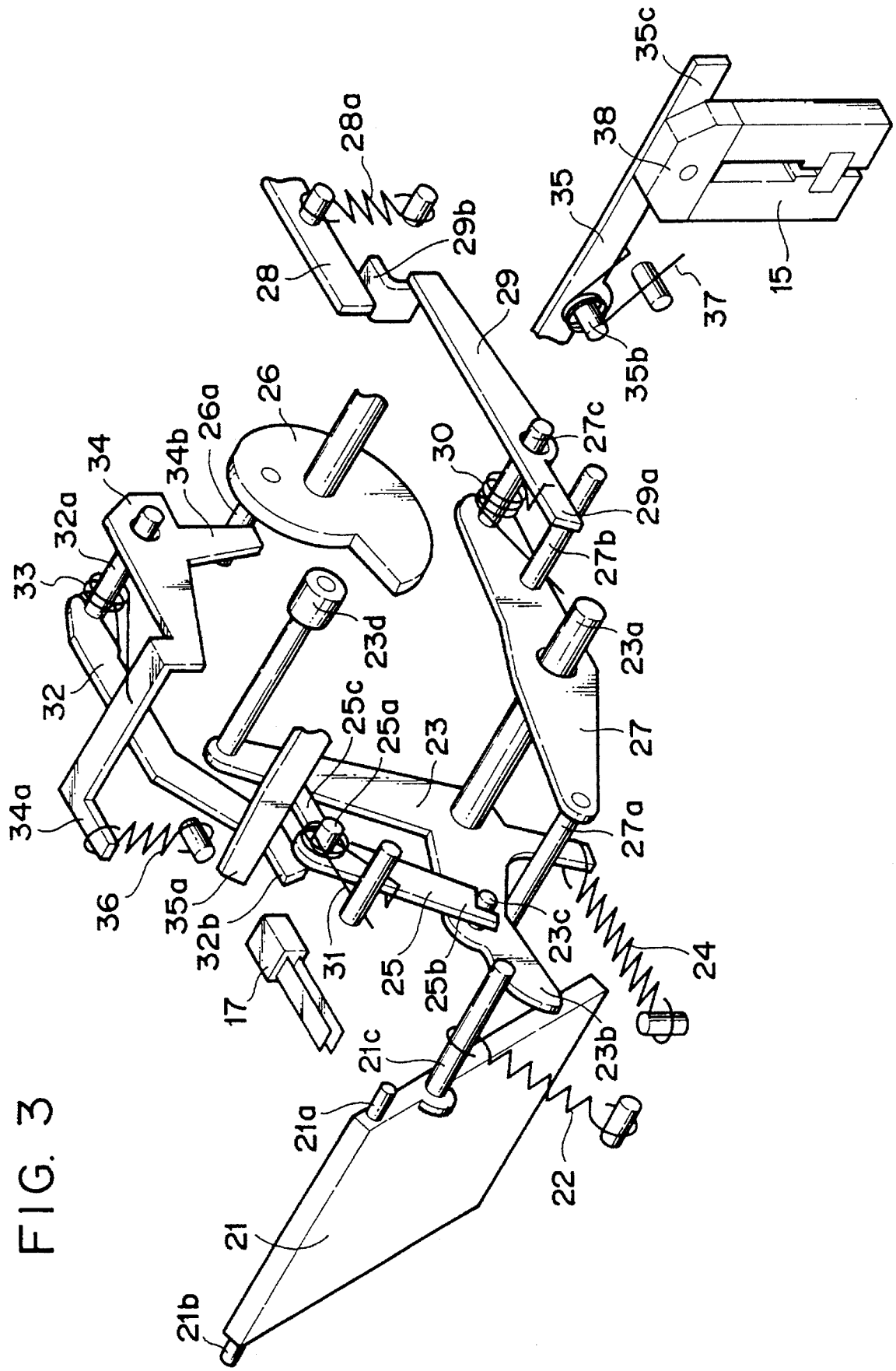
FIG. 3 is a perspective view illustrating a construction of a mechanism portion controlled by a computer 11 shown in FIG. 2.

A release switch 16 is connected to the computer 11. The release switch 16 is turned on when a release action is conducted from outside, thereby outputting a release signal to the computer 11. A mirror-up completion switch 17 opens and closes interlocking with retreating/returning actions of the mirror 21 (FIG. 3). The mirror-up completion switch 17 is connected to the computer 11. The mirror-up completion switch 17 is turned on Just before the retreat of the mirror is completed. When turned on, a signal indicating the completion of retreat of the mirror 21 is outputted to the computer 11.

A manual mirror-up switch 18 is manipulated when retreating the mirror 21 beforehand to prevent a vibration when photographed. The manual mirror-up switch 18 is connected to the computer 11. A timer circuit 14 connected to the computer 11 starts measuring a time in accordance with a command issued from the computer 11.

FIG. 3 is a perspective view of a construction of a mechanism controlled by the computer 11 shown in FIG. 2 but illustrates a state before starting a photographing action.

The mirror 21 is disposed, as in the conventional example, to lead a subject image from a photographing lens (unillustrated) to a finder (unillustrated). The mirror 21 is so supported on a baseplate (not shown) as to be rotatable about rotary shafts 21a, 21b fixed on both sides. A mirror pin 21c is formed on the side of the rotary shaft 21a of the mirror 21. The mirror-up completion switch 17 is so placed as to change over from an off-state to an on-state when coming into contact with the mirror pin 21c just before the completion of retreat of the mirror 21. A spring 22 is provided to return the mirror 21 which has been retreated. The spring 22 is arranged to bias the mirror 21 clockwise as viewed in the Figure.

A mirror-up lever 23 is so supported as to be rotatable about a shaft 23a fixed to the lever 23. The mirror-up lever 23 is biased clockwise in the Figure by a tension of a spring 24 attached to, as viewed in the Figure, a lower part of the mirror-up lever 23. One end 23b of the mirror-up lever 23 thereby impinges on the mirror pin 21c. The mirror pin 21c is thus biased counterclockwise in the Figure, resisting a tension of the spring 22. A pin 23c fixed to the mirror-up lever 23 is, however, engaged with a mirror start lever 25. The mirror-up lever 23 is therefore held in the illustrated position before photographing.

Further, a roller 23d provided at the other end (right side in the Figure) of the mirror-up lever 23 serves as a cam follower of a cam 26 connected directly to and driven by a motor (not shown). The cam 26 does not restrict the retreating action of the mirror at all in the illustrated state.

An aperture interlocking lever 27 is rotatably supported on the shaft 23a. The aperture interlocking lever 27 is biased clockwise through an aperture lever 29 by a tension of a spring 28a secured to a lens-side aperture lever 28. A pin 27a fixed to one end (left side in the Figure) of the aperture interlocking lever 27 is, however, engaged with the mirror-up lever 23. The aperture interlocking lever 27 is therefore held in the illustrated position.

An aperture lever 29 is rotatably supported on a pin 27c formed at one end (right side in the Figure) of the aperture interlocking lever 27. The aperture lever 29 is biased counterclockwise in the Figure by a tension of a spring 30 secured to the pin 27c. One end (left side in the Figure) 29a of the aperture lever 29, however, impinges on a pin 27b fixed to the aperture interlocking lever 27. The aperture lever 29 is therefore held in the illustrated position. Lens-side aperture interlocking lever 28 comes into contact with a tip part (right side in the Figure) 29b of the aperture lever 29. The aperture interlocking lever 28 is biased in a stop-down direction (downward in the Figure) by a tension of a spring 28a. The aperture lever 29 is thereby biased clockwise. A biasing force acting in this clockwise direction is, however, smaller than the counterclockwise biasing force caused by the tension of the spring 30 described above. Hence, the illustrated state (aperture open state) is held before the photographing action.

The mirror start lever 25 is so supported as to be rotatable about the shaft 25a fixed to this lever 25. The mirror start lever 25 is biased counterclockwise by a tension of a spring 31 secured to the shaft 25a. Further, as stated above, one end 25b of the mirror start lever 25 impinges on the pin 23c, thereby hindering a clockwise rotation of the mirror-up lever 23.

A release magnet reset lever 32 is so supported as to be rotatable about a shaft 32a fixed to the reset lever 32. This lever 32 is biased clockwise in the Figure by a tension of a spring 33 attached to the shaft 32a. The lever 32 comes into contact with a reset lever 34 and is thereby held in the illustrated state. A tip part (left side in the Figure) 32b of the lever 32 is so formed as to be capable of impinging on a tip part 35a of a release lever 35. The tip part 32b described above does not hinder the action of the release lever 35 in the illustrated state.

The reset lever 34 is rotatably supported on the shaft 32a. The reset lever 34 is biased counterclockwise in the Figure by a tension of a spring 36 secured to a tip part 34a of the reset lever 34. An arm member 34b formed at a lower portion, as viewed in the Figure, of the reset lever 34 impinges on a pin 26a fixed to the cam 26, thereby hindering an counterclockwise rotation of the reset lever 34.

The release lever 35 is so supported as to be rotatable about a shaft 35b fixed to the lever 35. The release lever 35 is biased counterclockwise by a tension of a spring 37 secured to the shaft 35b. An armature 38 provided at one end (right side in the Figure) 35c of the release lever 35 is, however, attracted to the release magnet 15. The release lever 35 is therefore kept in an illustrated state before starting the photographing action.

The release magnet 15 attracts the armature 38 when not energized but releases the attraction of the armature 38 when energized.

Further, the other end (left side in the Figure) 35a of the release lever 35 is so formed as to be capable of impinging on one end 25c of the mirror start lever 25.

The following is an explanation of the operation for normal photography.

When turning on the release switch 16 (FIG. 2), the release magnet 15 is energized in accordance with a command given from the computer 11, thereby releasing the attraction of the armature 38. As a result, the release lever 35 is rotated counterclockwise in the Figure about the shaft 35b serving as a fulcrum by the tension of the spring 37. The armature 38 separates from the release magnet 15. With this rotation, one end 35a of the release lever 35 impinges on the one end 25c of the mirror start lever 25, thereby interlocking the mirror start lever 25. The mirror start lever 25 consequently rotates clockwise in the Figure about the shaft 25a serving as a fulcrum, resisting the tension of the spring 31.

With the rotation described above, the tip part 25b of the mirror start lever 25 releases the engagement of the pin 23c of the mirror-up lever 23. The mirror-up lever 23 is thereby rotated clockwise in the Figure about the shaft 23a as a fulcrum by the tension of the spring 24. The mirror pin 21c which contacts the one end 23b of the mirror-up lever 23 is consequently interlocked. With this action, the mirror 21 rotates counterclockwise in the Figure about the rotary shafts 21a, 21b as fulcrums, resisting the tension of the spring 22. Namely, the mirror 21 performs a retreating action. Just before an end of the retreating action of the mirror 21, the mirror pin 21c impinges on the mirror-up completion switch 17. The mirror-up completion switch 17 is thereby changed over from the off-state to the on-state to output a signal to the computer 11.

When the mirror-up lever 23 rotates clockwise, the engagement of the pin 27a is released. Upon this release, the aperture interlocking lever 27 is rotated clockwise in the Figure about the shaft 23a as a fulcrum by the tension of the spring 28a. The lens-side aperture lever 28 moves downward as viewed in the Figure. With this action, a stop-down of the lens is started. This stop-down action is halted with a predetermined value by an aperture control mechanism (unillustrated).

After completing the above-mentioned retreating action of the mirror 21 and the stop-down action as well, tripping the leading and trailing curtains of the shutter 12 (FIG. 2) is started. An exposing action is thus effected.

When a signal is output concomitant with the tripping of the trailing curtain of the shutter 12, a motor driving circuit (not shown) starts operating. A motor (not illustrated) thereby causes the cam 26 to rotate counterclockwise in the Figure. With this action, the pin 26a permits the reset lever 34 to rotate clockwise in the Figure about the shaft 32a as a fulcrum. Further, the release magnet reset lever 32 engaged with the reset lever 34 by the biasing force of the spring 33 rotates clockwise interlocking with the rotation of the reset lever 34. With the rotation of the lever 32 described above, one end 32b of the lever 32 impinges on one end 35a of the release lever 35, thereby interlocking the release lever 35. The release lever 35 consequently rotates clockwise in the Figure about the shaft 35b as a fulcrum. The armature 38 is attracted to the release magnet 15.

At this time, the tensile force of the spring 33 which causes the clockwise rotation of the tip part 35a is set larger than the tensile force of the spring 37 which causes the counterclockwise rotation of the one end 35a of the release lever 35. When the armature 38 is attracted to the release magnet 15, however, the lever 32 stops because of its clockwise rotation being hindered. Only the reset lever 34 rotates clockwise.

With the actions described above, the reset action of the release magnet 15 is completed, thus returning to the pre-photographing position.

Thereafter, the cam 26 continues to rotate counterclockwise, and its cam surface pushes up the roller 23d. The mirror-up lever 23 is thereby rotated about the shaft 23a as a fulcrum, resisting the tension of the spring 24. Interlocking with this action, the mirror 21 is rotated clockwise in the Figure about the rotary shafts 21a, 21b serving as fulcrums by the tension of the spring 22. The mirror 21 thus reverts to the illustrated state. Further, the pin 23c of the mirror-up lever 23 engages with the one end 25b of the mirror start lever 25. Thus, the return action of the mirror 21 is completed. In the course of this return action of the mirror 21, the mirror pin 21c separated from the mirror-up completion switch 17. The mirror-up completion switch 17 changes over from the on-state to the off-state.

Further, with the return action of the mirror-up lever 23, the pin 27a is locked, whereby the aperture interlocking lever 27 interlocking with the mirror-up lever 23 rotates counterclockwise in the Figure about the shaft 23a as a fulcrum. The aperture of the lens thereby reverts to an open state. The cam 26 is stopped by a charge completion switch mechanism (unillustrated) after making one rotation and reverts to the illustrated state. Thus, a series of exposing actions are completed.

FIG. 4 is a flowchart of assistance in explaining the operation of the above-mentioned shutter control device according to this invention.

To start with, when switching on a power supply (unillustrated) of the camera, the computer 11 judges whether the release switch 16 is turned on or off in step S1. When judging that the release switch 16 is turned off, the action proceeds to step S10. In step S2, the computer 11 sets a time T1 to a release time lag T, and the action proceeds to step S3. In step S3, the computer 11 permits the release magnet energizing circuit 13 to energize the release magnet 15, and the action proceeds to step S4. As explained earlier, the release magnet 15 thereby releases the attraction of the armature 38. Started are the retreating action of the mirror 21 and the stop-down action. In step S4, the computer 11 permits the timer circuit 14 to measure the time, and the action proceeds to step S5.

In step S5, the computer 11 compares an elapsed time t from the beginning of the time measurement by the timer circuit 14 with the time T (T= T1) set in step S2. If the elapsed time t is smaller than T, the action goes back to step S5, wherein the time measuring action is repeated until the elapsed time t comes to T. If the elapsed time t exceeds T, the action proceeds to step S6.

In step S6, the computer 11 judges whether the mirror-up completion switch 17 is turned on or off. When judging that the mirror-up completion switch 17 is turned off, the action goes back to step S6. The process in step S6 is repeated until the switch 17 is turned on. When judging that the mirror-up completion switch 17 is turned on, i.e., when the computer 11 detects a signal outputted from the mirror-up completion switch 17, the action proceeds to step S7.

Note that steps S5 and S6 may be reversed in terms of the order of processing.

In step S7, the computer 11 initiates the tripping action of the shutter 12. Thus, the exposing action is completed. In next step S8, the computer 11 judges whether the manual mirror-up switch 18 is turned on or off. When judging that the switch 18 is turned on, step S9 is skipped, and the flow comes to an end (for returning the mirror 21 and the aperture as well if the manual mirror-up switch 18 is turned on). When judging that the switch 18 is turned off in step S8, the action proceeds to step S9. The computer 11 initiates the predetermined return actions such as returning of the mirror 21 and opening of the aperture, thus terminating the flow.

When it is judged that the release switch 16 is turned off in step S1, the action proceeds to step S10. In step S10, the computer 11 judges whether the manual mirror-up switch 18 is turned on or off. When judging that the switch 18 is turned off, the flow is finished. When judging that the switch 18 is turned on, the action proceeds to step S11. In step S11, the computer 11 permits the release magnet energizing circuit 13 to energize the release magnet 15, and the action proceeds to step S12. With this action, as described above, the release magnet 15 releases the attraction of the armature 38. The retreat of the mirror 21 and the stop-down are started.

In step S12, the computer 11 judges whether the release switch 16 is turned on or off. When judging that the release switch 16 is turned on, the action proceeds to step S13. The computer 11 sets the release time lag T to a time T2 shorter than the time T1, and the action proceeds to step S4.

The following is an elucidation of the reason why the time T2 is herein shorter than the time T1. During the manual mirror-up action, the retreat of the mirror 21 and the stop-down have already been completed, and, therefore, the release time lag can be reduced. It is not, however, necessarily preferable that the time T2 be set always shorter than the time T1. The vibration produced in the camera can be well attenuated when turning on the release switch 16 by setting the time T2 longer than the time T1. Namely, the time T1 and the time T2 can be each set to an optimum time under a variety of use conditions of the camera.

When judging that the release switch 16 is turned off in step S12, the action proceeds to step S14. In step S14, the computer 11 judges whether the manual mirror-up switch 18 is turned on or off. When judging that the switch 18 is turned on, the action goes back to step S12. In the case of judging that the switch 18 is turned off (the on-state of the manual mirror-up switch 18 is released), the action proceeds to step S9.

Note that the action flow shown in FIG. 4 is accessed with a predetermined period during power-on of the camera and repeatedly executed.

As discussed above, according to the shutter control device in one embodiment of the present invention, in a special case where the mirror-up time fluctuates, it is possible to prevent the vignetting of the photographing picture due to the fluctuations in the mirror-up time and to prevent an occurrence of overexposure. In the normal photographing, fluctuations in the release time lag can be avoided.

According to the shutter control device in another embodiment, when performing both the measurement of the predetermined time and the detection of the mirror-up completion, the exposure unit is actuated. Hence, the vignetting of the photographing picture does not occur. Moreover, the photographing with the uniform release time lag can be normally performed.

The shutter control device in still another embodiment is constructed so that the predetermined time is set depending on whether or not the detection (of the mirror-up completion) is made by the position detecting unit before generating the release signal. The release time lag during the manual mirror-up action and the release time lag during the normal photographing action can be set to different values.

According to the shutter control device in a further embodiment, the release time lag during the manual mirror-up action can be set shorter than the release time lag during the normal photographing action. Hence, it is possible to sufficiently utilize one of the merits inherent in the manual mirror-up photographing, whereby a shutter chance is not lost.

It is apparent that a wide range of different working modes can be formed based on the principles herein discussed without deviating from the spirit and scope of the invention, the latter of which is defined in the appended claims.

What is claimed is:

1. A shutter control device comprising:

a shutter having a leading curtain and a trailing curtain;

a release signal generator;

a mirror for reflecting light of a subject toward a viewing optical system;

a mirror driving member for shifting said mirror from a first position on a photographing light path to a second position off said photographing light path;

a position detector disposed to detect that said mirror reaches the vicinity of said second position, and generating a position signal;

a timer which starts measuring a predetermined time substantially upon generation of said release signal by said release signal generator and which generates a time measurement end signal when said predetermined time elapses; and a controller which actuates said leading curtain in response to receiving both of said time measurement end signal and said position signal.

2. The shutter control device according to claim 1, wherein said mirror is shifted from said first position to said second position by said mirror driving member in response to said release signal.

3. The shutter control device according to claim 1, further comprising setting means for setting said predetermined time.

4. The shutter control device according to claim 1, further comprising an externally operable switch which generates an actuation signal and wherein said mirror is shifted from said first position to said second position in response to said actuation signal.

5. The shutter control device according to claim 4, further comprising a setting portion for setting said predetermined time, wherein said setting portion sets said predetermined time to a shorter time when said actuation signal is received than when said actuation signal is not received.

6. The shutter control device according to claim 4, further comprising a setting portion for setting said predetermined time, wherein said setting portion sets said predetermined time to a longer time when said actuation signal is received than when said actuation signal is not received.

7. The shutter control device according to claim 4, including a setting portion for setting said predetermined time to different times depending upon whether said actuation signal is generated.

8. The shutter control device according to claim 1, wherein the actuation of said leading curtain by said controller is independent of the order in which said time measurement end signal and said position signal are received.

9. A shutter control device comprising:
   an exposing device having a leading curtain and a trailing curtain;
   a release signal generator;
   a mirror shiftable to a first position on a photographing light path and to a second position off said photographing light path;
   a position detector disposed to detect that said mirror reaches the vicinity of said second position and generating a position signal;
   a timer which starts measuring a predetermined time substantially upon generation of said release signal by said release signal generator and which generates a time measurement end signal when said predetermined time elapses; and
   a controller which actuates said leading curtain in response to receipt of said position signal if a detection time from the generation of said release signal to the detection by said position detector is longer than said predetermined time, and in response to receipt of said time measurement end signal if said detection time is shorter than said predetermined time.

10. The shutter control device according to claim 9, further comprising a manual mirror-up judging portion for judging whether or not the detection is made by said position detecting means before said release signal is generated, and a setting portion for setting said predetermined time on receiving a result of a judgment made by said manual mirror-up judging portion.

11. The shutter control device according to claim 9, further comprising a setting portion for changeably setting said predetermined time.

12. The shutter control device according to claim 11, further comprising an externally operable switch which generates an actuation signal, wherein said mirror is shifted from said first position to said second position in response to said actuation signal, and said setting portion sets said predetermined time to different times depending on whether said actuation signal is generated.

* * * * *